Sept. 25, 1951 J. J. DILL 2,569,153
APPARATUS FOR STERILIZING PLASMA, VACCINE AND OTHER FLUIDS
Filed Oct. 19, 1949 3 Sheets-Sheet 3

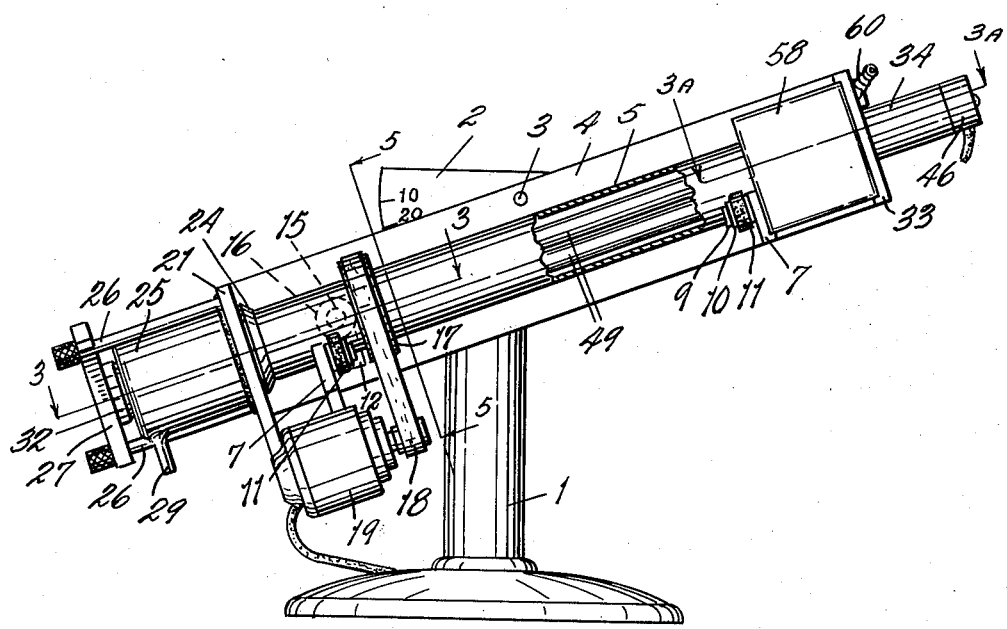

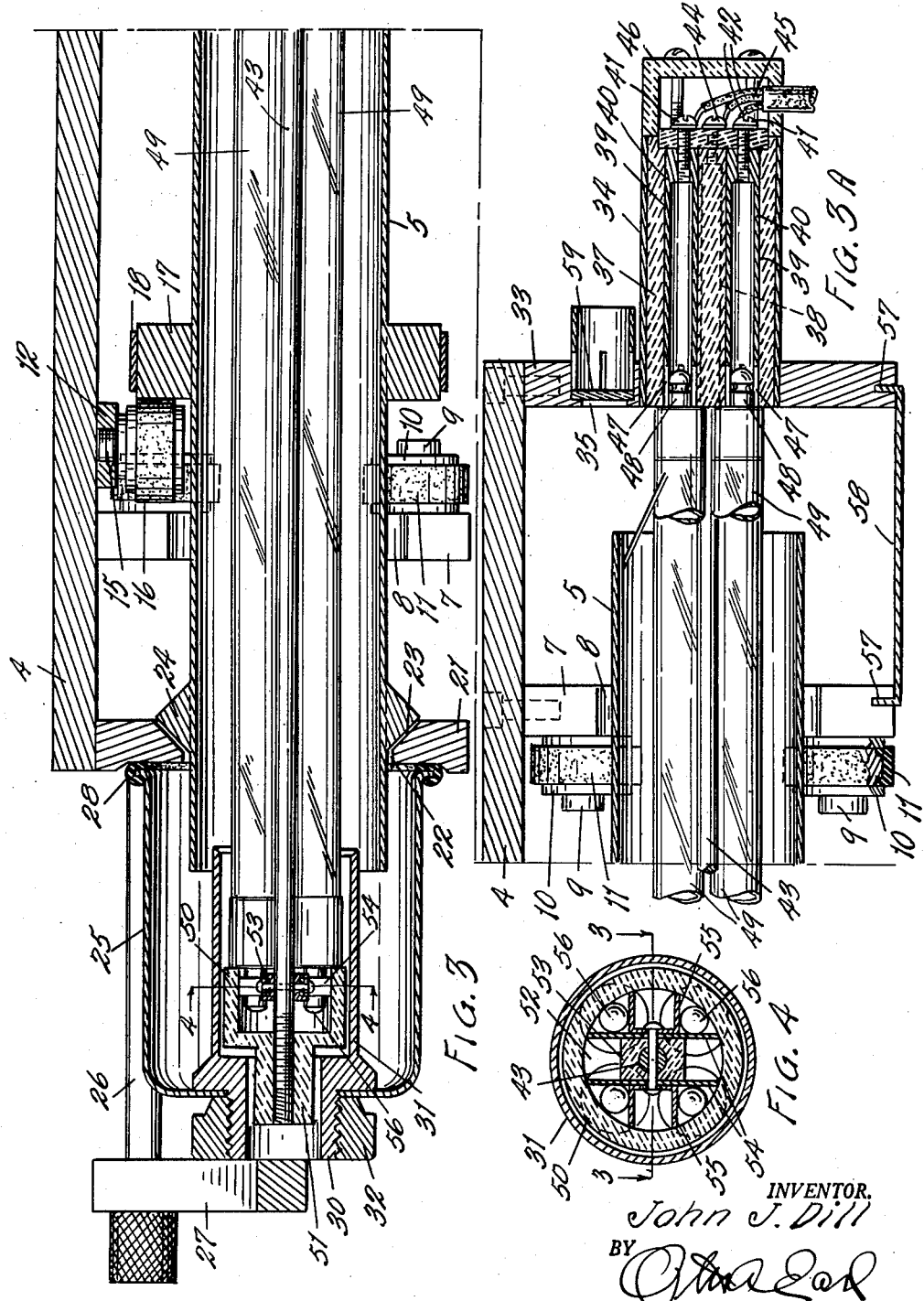

INVENTOR.
John J. Dill
BY
Attorney.

Patented Sept. 25, 1951

2,569,153

UNITED STATES PATENT OFFICE 2,569,153

APPARATUS FOR STERILIZING PLASMA, VACCINE, AND OTHER FLUIDS

John J. Dill, Delton, Mich.

Application October 19, 1949, Serial No. 122,349

10 Claims. (Cl. 250—49)

This invention relates to improvements in apparatus for sterilizing plasma, vaccine and other fluids.

The main objects of this invention are:

First, to provide a liquid irradiating device having a high capacity for the amount of fluid which may be irradiated and the degree of sterilization which may be accomplished by the irradiation.

Second, to provide a device which is easily dismantled for cleaning and easily reassembled.

Third, to provide a fluid irradiating device which is easily operated and which does not require the attention of highly skilled technicians.

Fourth, to provide means for collecting the sterilized liquid after it has passed through the irradiating device and maintaining the liquid in sterile condition.

Fifth, to provide a sterilizing device with means for passing cooling air therethrough in a sterile condition so as to prevent the device from overheating and prevent the air from recontaminating the liquid passing through the device.

Sixth, to provide novel means for supporting and driving a centrifugal fluid directing cylinder about an ultraviolet ray emitting lamp and effectively sealing the interior of said cylinder against the entrance of unsterilized air.

Other objects and advantages relating to details of my invention will be apparent from a consideration of the following description and claims.

The drawings, of which there are three sheets, illustrate a highly practical embodiment of my invention.

Fig. 1 is a front elevational view of my machine partially broken away in longitudinal cross section.

Fig. 2 is a plan view of the sterilizer with a portion of the upper casing broken away.

Fig. 3 is a fragmentary longitudinal cross sectional view through the lower end of the sterilizer taken along the plane of the line 3—3 in Figs. 1, 4 and 5.

Fig. 3A is a fragmentary longitudinal cross sectional view through the upper or right end of the sterilizer taken along the plane of the line 3A—3A in Figs. 1 and 9, Fig. 3A being a continuation of Fig. 3.

Fig. 4 is a transverse cross sectional view through the lower socket or lamp receiving element taken along the plane of the line 4—4 of Fig. 3.

Figures 5, 6, 9:
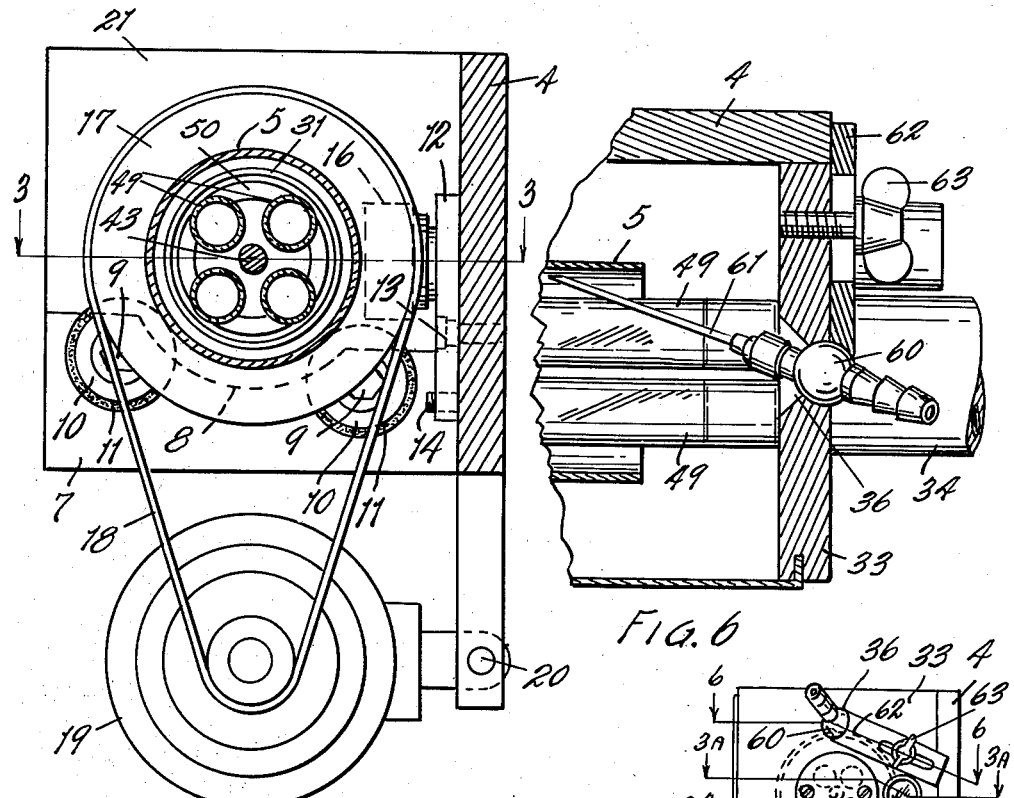
Fig. 5 is a transverse cross sectional view through the sterilizing cylinder taken along the plane of the line 5—5 in Figs. 1 and 2.
Fig. 6 is a fragmentary transverse cross sectional view through the end plate of the upper housing taken along the line 6—6 in Fig. 9.
Fig. 9 is an end elevational view of the upper housing.
Figure 7:
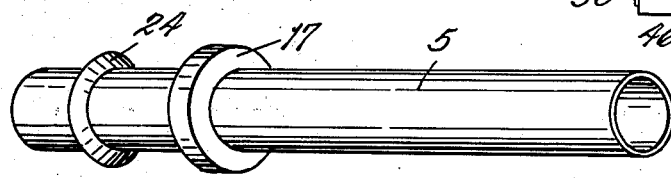
Fig. 7 is a perspective view of the sterilizing cylinder.
Figure 8:
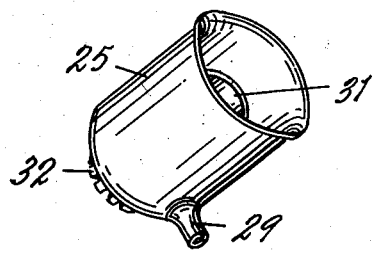
Fig. 8 is a perspective view of the sterile liquid receiver.

It has previously been proposed to sterilize liquids by causing a thin film of the liquid to pass in close proximity to a source of ultraviolet light such as a mercury or other vapor tube.

Previously developed machines for this purpose have been subject to one or more disadvantages in that they were difficult to disassemble and reassemble for required cleaning and in that they required close attention of relatively highly skilled technicians to control the rate of flow of the liquid to insure the proper exposure of the liquid to irradiation for complete sterilization.

My device consists generally of a cylinder which is disposed in an inclined position and rapidly rotated about a central source of ultraviolet light in such a manner that liquid admitted to the upper end of the cylinder will be thrown centrifugally into a uniform thin film which flows progressively down the cylinder while being subjected on its inner surface to the ultraviolet light. The sterilized liquid is collected from the lower end of the cylinder in a sterilely sealed cup or receiver for transfer to containers as desired.

In the drawings I have illustrated a pedestal 1 having protractor plate 2 secured to its upper end. The protractor plate has a pivotal connection 3 for the elongated base plate 4 which rotatably supports the sterilizing cylinder 5. A clamping thumb screw 6 projects from the back of the protractor plate for clamping the base plate 4 and cylinder 5 in their angularly adjusted position.

Projecting from the lower portion of the base plate 5 and spaced inwardly of its ends are a pair of support plates or arms 7 which are circularly notched as at 8 to partially embrace the cylinder 5. The arms 7 are each provided with a pair of spaced pins 9 on which the four supporting rollers 10 are rotatably supported on axes parallel to the axis of the cylinder 5. Preferably the rollers 10 are provided with rubber tires 11 for smooth rolling engagement with the surface of the cylinder. It is essential to the satisfactory operation of the machine that care be taken in assuring that the outer surface of the cylinder 5 is straight and true and that the rollers 10 are properly positioned for true rolling action on the surface of the cylinder.

In order to support the cylinder 5 against longitudinal movement in its inclined position, the base plate 4 is provided with a lever 12 pivoted at 13 (see Fig. 5) and lying flat along the base plate just upwardly from the lower support arm 7. The lever 12 is angularly adjustable about its pivot and may be clamped in place by the set screw 14. The upper end of the lever 12 carries a pin 15 on which the thrust roller 16 is rotatable. The thrust roller 16 is arranged to bear against and roll on a thrust collar 17 formed on the cylinder 5. The periphery of the thrust collar also forms a pulley for driving engagement with the driving belt 18.

An electric motor 19 is pivotally mounted as at 20 on an arm projecting below the base plate 4 and is so arranged that the weight of the motor serves to tighten the belt 18. It will thus be seen that the cylinder is simply supported and driven for true and essentially vibration free rotation in an inclined plane.

Projecting from the lower end of the base plate 4 is a seal plate 21 which forms a central hole 22 for passing the lower end of the cylinder 5. The upper edge of the hole 22 is beveled as at 23 and the periphery of the cylinder is provided with a coacting beveled seal flange 24. By adjustment of the lever 12 and thrust roller 16, the seal flange 24 may be brought into extremely closely spaced relationship with the beveled surface 23 to form a centrifugal air seal as will be readily understood. The lower end of the cylinder 5 projects substantially beyond the seal plate 21.

Removably positioned around the lower end of the cylinder 5 is a cup-like receiver 25 secured in place by the screws 26 and removable cross bar 27. The rim of the receiver 25 is provided with a rubber gasket 28 sealingly clamped against the bottom of the seal plate 21 and around the lower end of the cylinder 5. The lower end of the receiver is provided with a radially extending discharge tube 29 which can be connected by sterile tubing to a storage container. The bottom of the receiver 25 is apertured to pass the threaded neck 30 of a cylindrical shield 31. The shield is removably clamped to the receiver by the hand nut 32 and extends centrally inwardly of the receiver to within the lower end of the sterilizing cylinder 5.

At the upper end of the sterilizing tube there is provided an end plate 33 spaced substantially from the upper end of the cylinder. The end plate 33 is centrally bored to receive the socket housing 34 and further provided with a radially disposed viewing hole 35 and entrance hole 36. The socket housing 34 contains a cylindrical block of insulating material 37 which is axially bored to form a central rod passage 38 and four radially spaced socket passages 39. Metal sockets 40 are received in the passages 39 and electrically connected through the terminal screws 41 with power supply cables 42. A tie rod 43 received in the rod passage 38 serves as a common electrical return and is connected through the terminal screw 44 with a return cable 45. A suitable cover 46 for the terminal screws and the ends of the cables is provided. The inner ends of the sockets 39 are axially slotted as at 47 to springably receive the prongs or tips 48 of four ultraviolet ray emitting tubes 49 which extend longitudinally downwardly alongside of the tie rod 43.

A lower socket member 50 of insulating material is received within the shield 31 in the receiver and provided with a cylindrical extension 51 extending into the neck of the shield. The socket member forms an upwardly opening cylindrical recess 52 within which the contact block 53 secured to the tie rod 43 is positioned. A pair of straight plates 54 and U-shaped plates 55 secured to the terminal block cooperate with each other and the surface of the recess 52 to form sockets for receiving the lower terminal pins 56 of the ray tubes 49. The lower ends of each of the tubes are thus electrically connected to the tie rod 43. The lower ends of the tubes are further mechanically supported and connected to the upper socket by threading the tie rod into the extension 51 of the lower socket 50.

The upper end plate 33 and the end of the upper support arm 7 are provided with peripheral grooves 57 for receiving a sheet metal housing 58 enclosing the top and side of the upper end of the sterilizing cylinder. A lens or shield 59 of ultraviolet filtering glass is positioned in the viewing port 35 to protect the operator's eyes from the intense ultraviolet light and a ball coupling 60 is swivelly received in the entrance opening 36 for admitting liquid to the sterilizing cylinder. The coupling 60 is designed to receive a familiar type of hypodermic needle 61 which may be adjusted as illustrated to deposit liquid along the inner surface of the sterilizing cylinder. The coupling 60 is clamped in adjusted position by the bar 62 and wing nut 63.

Attention is directed to the fact that there is substantial clearance between the shield 31 and the lower socket member 50 and further clearance between the socket projection 51 and the hollow threaded neck 30 of the shield. It is thus possible for air to enter through the shield and into the lower end of the sterilizing cylinder 5. However, before this air can enter the sterilizing cylinder, it must flow past a substantial portion of the effective length of the ultraviolet tubes 49. This air is therefore sterilized and cannot contaminate the fluid in the cylinder or in the receiver. The supply of this air is highly desirable, as it will flow upwardly through the sterilizing cylinder and partially cool the cylinder and the ultraviolet tubes. This also prevents overheating of the liquid and possible coagulation thereof on the cylinder wall. The cooling air is discharged into the housing 58 and escapes from the bottom thereof. Should the flow of air be reversed through the sterilizing cylinder for any reason, air entering the top of the cylinder will have to flow around the ultraviolet tubes and be sterilized along with the entering liquid.

I have thus described a highly practical form of my sterilizing mechanism so that others may reproduce and operate the same with such variations as may be expedient, for a variety of uses. What I claim to be new and desire to obtain by Letters Patent is set out in the following claims.

Having thus described my invention, what I claim as new and desire to secure by Letters Patent is:

1. A fluid sterilizing device comprising, a support, a base plate pivotally secured to said support and angularly adjustable in a vertical plane, said base plate having laterally and longitudinally spaced rollers mounted thereon for rotation about axes parallel to said plate, a sterilizing cylinder rotatably and freely supported on said rollers in an adjustable inclined position and having a thrust collar projecting from its outer surface, a thrust roller mounted on said base plate and arranged to roll along said thrust collar about an axis generally perpendicular to said cylinder, a seal plate projecting from said base plate and forming a hole embracing the lower end of said cylinder, a flange on said cylinder cooperative with said seal plate to form a centrifugal seal, said thrust roller being adjustably mounted on said base plate for longitudinally positioning said cylinder and said flange relative to said seal plate, a cup-like receiver removably clamped and sealed to the lower side of said seal plate and embracing the lower end of said cylinder, a fluid outlet formed in the lower portion of said receiver, a tubular shield positioned within said receiver and removably secured thereto, said shield forming a passage opening through the bottom of said receiver, a lower terminal support positioned within but not closing said shield, lower electrical terminal elements positioned in said lower terminal support, an upper end plate on said base plate, an upper terminal support carried by said end plate and having a plurality of upper electrical terminal elements mounted therein and aligned with said lower terminal elements, an electrically conducting tie rod mechanically connecting said terminal supports and extending axially through said cylinder, said tie rod being electrically connected to said lower terminal elements, a plurality of sterilizing ray emitting tubes extending alongside of said rod through said cylinder and having terminals on their ends electrically connected to said terminal elements, means connected to energize said upper terminal elements, a common electrical return cable connected to said tie rod at the upper end thereof, a hollow needle adjustably mounted on said end plate to deliver fluid to the inner surface of said cylinder, said shield in said receiver extending inwardly into the bottom of said cylinder and substantially beyond said lower terminal support whereby a substantial portion of the effective length of said ray tubes is positioned within said shield and whereby air passing through said shield is subjected to sterilizing rays before entering said cylinder and said receiver, and a motor for rotating said cylinder.

2. A fluid sterilizing device comprising, a support, a base plate pivotally secured to said support and angularly adjustable in a vertical plane, said base plate having laterally and longitudinally spaced rollers mounted thereon for rotation about axes parallel to said plate, a sterilizing cylinder rotatably and freely supported on said rollers in an adjustable inclined position and having a thrust collar projecting from its outer surface, a thrust roller mounted on said base plate and arranged to roll along said thrust collar about an axis generally perpendicular to said cylinder, a seal plate projecting from said base plate and forming a hole embracing the lower end of said cylinder, a flange on said cylinder cooperative with said seal plate to form a centrifugal seal, a cup-like receiver removably clamped and sealed to the lower side of said seal plate and embracing the lower end of said cylinder, a fluid outlet formed in the lower portion of said receiver, a tubular shield positioned within said receiver and secured thereto, said shield forming a passage opening through the bottom of said receiver, a lower terminal support positioned within but not closing said shield, lower electrical terminal elements positioned in said lower terminal support, an upper end plate on said base plate, an upper terminal support carried by said end plate and having a plurality of upper electrical terminal elements mounted therein and aligned with said lower terminal elements, an electrically conducting tie fixedly connecting said terminal supports and extending axially through said cylinder, said tie being electrically connected to said lower terminal elements, a plurality of sterilizing ray emitting tubes extending alongside of said tie through said cylinder and having terminals on their ends electrically connected to said terminal elements, means connected to energize said upper terminal elements, a common electrical return cable connected to said tie at the upper end thereof, a hollow needle adjustably mounted on said end plate to deliver fluid to the inner surface of said cylinder, said shield in said receiver extending inwardly substantially beyond said lower terminal support whereby a substantial portion of the effective length of said ray tubes is positioned within said shield and whereby air passing through said shield is subjected to sterilizing rays before entering said cylinder and said receiver, and a motor for rotating said cylinder.

3. A fluid sterilizing device comprising, a base, laterally and longitudinally spaced rollers mounted on parallel axes on said base, a cylinder freely supported on said rollers for rotation about its axis in an inclined plane, a collar projecting from the outer surface of said cylinder and forming a pulley surface, a belt cooperative with said surface, a motor for driving said belt, a thrust roller adjustably supported on said base to rollingly engage a radially extending surface on said collar to resist thrust movement of said cylinder, a seal plate having a hole formed therethrough and embracing the lower end of said cylinder, a flange on said cylinder cooperative with the periphery of said hole to form a centrifugal seal, said thrust roller being adjustable longitudinally of said cylinder to adjust the spacing of said seal, a cup-like receiver removably secured and sealed to said seal plate and embracing the end of said cylinder, a sterile fluid outlet formed in said receiver, an upper end plate spaced from the upper end of said cylinder and having a plurality of socket elements mounted thereon, a plurality of sterilizing ray emitting tubes having their upper ends received in said socket elements and extending axially through said cylinder, a tie element extending through said cylinder and mechanically connecting the lower ends of said ray tubes to said socket elements and forming a common electric return for said tubes, and means for introducing a liquid to be sterilized onto the inner surface of said cylinder near the upper end thereof.

4. A fluid sterilizing device comprising, a base, laterally and longitudinally spaced rollers mounted on parallel axes on said base, a cylinder freely supported on said rollers for rotation about its axis in an inclined plane, a collar projecting from the outer surface of said cylinder, a belt, a pulley surface on said cylinder cooperative with said surface, a motor for driving said belt, a thrust roller adjustably supported on said base to rollingly engage a radially extending surface on said collar to resist thrust movement of said cylinder, a seal plate having a hole formed therethrough and embracing the lower end of said cylinder, a flange on said cylinder cooperative with the periphery of said hole to form a centrifugal seal, said thrust roller being adjustable longitudinally of said cylinder to adjust the spacing of said seal, a cup-like receiver removably secured and sealed to said seal plate and embracing the end of said cylinder, a sterile fluid outlet formed in said receiver, an upper end plate spaced from the upper end of said cylinder and having a plurality of terminal elements mounted thereon, a plurality of sterilizing ray emitting tubes having their upper ends connected to said elements and extending axially through said cylinder, a tubular element extending through the bottom of said receiver and loosely embracing the lower ends of said ray tubes, said ray tubes having a substantial portion of their effective length received in said tubular element, electrical conductors connected to energize said ray tubes, and means for introducing a liquid to be sterilized onto the inner surface of said cylinder near the upper end thereof.

5. A fluid sterilizing device comprising, a base, laterally and longitudinally spaced rollers mounted on parallel axes on said base, a cylinder freely supported on said rollers for rotation about its axis in an inclined plane, a collar projecting from the outer surface of said cylinder, a belt, a pulley surface on said cylinder cooperative with said surface, a motor for driving said belt, a thrust roller supported on said base to rollingly engage a radially extending surface on said collar to resist thrust movement of said cylinder, a seal plate having a hole formed therethrough and embracing the lower end of said cylinder, a cup-like receiver removably secured and sealed to said seal plate and embracing the end of said cylinder, a sterile fluid outlet formed in said receiver, an upper end plate spaced from the upper end of said cylinder and having a plurality of terminal elements mounted thereon, a plurality of sterilizing ray emitting tubes having their upper ends connected to said elements and extending axially through said cylinder, a tubular element extending through the bottom of said receiver and loosely embracing the lower ends of said ray tubes, said ray tubes having a substantial portion of their effective length received in said tubular element, electrical conductors connected to energize said ray tubes, and means for introducing a liquid to be sterilized onto the inner surface of said cylinder near the upper end thereof.

6. A fluid sterilizing device comprising, a cylinder, rollers supporting said cylinder for rotation about its axis in an inclined plane, a collar projecting from the outer surface of said cylinder, a belt, a pulley surface on said cylinder cooperative with said surface, a motor for driving said belt, a radially extending surface on the exterior of said cylinder, a thrust roller supported to rollingly engage said radially extending surface to resist thrust movement of said cylinder, a seal plate having a hole formed therethrough and embracing the lower end of said cylinder, a flange on said cylinder cooperative with the periphery of said hole to form a centrifugal seal, a cup-like receiver removably secured and sealed to said seal plate and embracing the end of said cylinder, a sterile fluid outlet formed in said receiver, an upper end plate spaced from the upper end of said cylinder and having a terminal element mounted thereon, a sterilizing ray emitting tube having its upper end engaged with said terminal element and extending axially through said cylinder, a tubular element extending through the wall of said receiver and loosely embracing the lower end of said ray tube, said ray tube having a substantial portion of its effective length received in said tubular element, electrical conductors connected to energize said ray tube, and means for introducing a liquid to be sterilized onto the inner surface of said cylinder near the upper end thereof.

7. A fluid sterilizing device comprising, a cylinder mounted for rotation about an inclined axis, a seal plate having a hole formed therein embracing the lower end of said cylinder, a flange on said cylinder forming a centrifugal seal with the periphery of said hole, a cup-like receiver removably sealed to said seal plate and around the lower end of said cylinder, a sterilizing ray emitting tube extending through said cylinder, a shield element opening through said receiver and embracing the lower end of said ray tube whereby air passing through said shield element is subjected to sterilizing rays before entering said cylinder, and means for introducing a fluid to be sterilized onto the inner surface of said cylinder at the upper end thereof.

8. A fluid sterilizing device comprising, a cylinder mounted for rotation about an inclined axis, a seal plate having a hole formed therein embracing the lower end of said cylinder, a flange on said cylinder forming a centrifugal seal with the periphery of said hole, a cup-like receiver removably sealed to said seal plate and positioned around the lower end of said cylinder, a sterilizing ray emitting tube extending within said cylinder, and means for introducing a fluid to be sterilized onto the inner surface of said cylinder at the upper end thereof.

9. A fluid sterilizing device comprising, a cylinder mounted for rotation about an inclined axis, a seal plate having a hole formed therein embracing the lower end of said cylinder, cooperative radially extending surfaces on said cylinder and said seal plate forming a centrifugal seal about the periphery of said hole, a cup-like receiver removably sealed to said seal plate and around the lower end of said cylinder, a sterilizing ray emitting tube extending within said cylinder, a shield element opening through said receiver and embracing the lower end of said ray tube whereby air passing through said shield element is subjected to sterilizing rays before entering said cylinder, and means for introducing a fluid to be sterilized onto the inner surface of said cylinder at the upper end thereof.

10. A fluid sterilizing device comprising, a cylinder mounted for rotation about an inclined axis, a seal plate having a hole formed therein embracing the lower end of said cylinder, cooperative radially extending surfaces on said cylinder and said seal plate forming a centrifugal seal about the periphery of said hole, a cup-like receiver removably sealed to said seal plate and around the lower end of said cylinder, a sterilizing ray emitting tube extending within said cylinder, and means for introducing a fluid to be sterilized onto the inner surface of said cylinder at the upper end thereof.

JOHN J. DILL.

REFERENCES CITED

The following references are of record in the file of this patent:

UNITED STATES PATENTS

| Number | Name | Date |
|---|---|---|
| 1,118,006 | Henri et al. | Nov. 24, 1914 |
| 1,132,265 | Henri et al. | Mar. 16, 1915 |
| 1,842,313 | Chaney | Jan. 19, 1932 |
| 2,072,417 | Berndt et al. | Mar. 2, 1937 |
| 2,119,784 | Johnston | June 7, 1938 |